S. W. MOISSELLE.
COMB.
APPLICATION FILED APR. 8, 1918.
1,303,572.
Patented May 13, 1919.
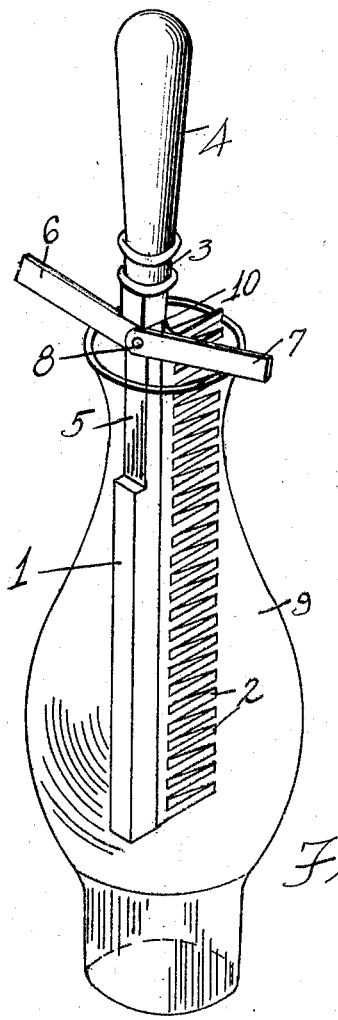
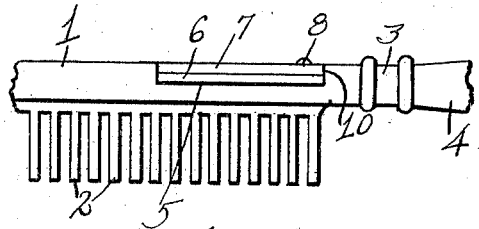
Inventor
SOL. WILLIAM MOISSELLE
Witness
By Charles E. Winey
Attorney

UNITED STATES PATENT OFFICE.

SOL WILLIAM MOISSELLE, OF ATLANTA, GEORGIA, ASSIGNOR TO B., J., AND E. CLEIN, OF ATLANTA, GEORGIA, A FIRM.

COMB.

1,303,572. Specification of Letters Patent. Patented May 13, 1919.

Application filed April 8, 1918. Serial No. 227,176.

*To all whom it may concern:*

Be it known that I, SOL WILLIAM MOISSELLE, a subject of the King of Great Britain, residing at Atlanta, county of Fulton, State of Georgia, have invented a certain new and useful Improvement in Combs, and declare the following to be a full, clear, and exact description of the same, such as will enable others skilled in the art to which it pertains to make and use the same, reference being had to the accompanying drawings, which form a part of this specification.

This invention relates to combs, and its object is to produce a metal comb provided with means for suspending it within a lamp chimney or the like for the heating thereof. A further object is to produce a comb of the character stated having an attachment adapting it to be supported on a lamp chimney, the attachment being adapted to be folded flush with the back of the comb when not in use, these primary objects and the general features of the device are shown in the accompanying drawings in which—

Figure 1 is a perspective view showing my improved comb when suspended within a lamp chimney.

Fig. 2 is a side elevation of a comb showing the suspending attachment as folded in the back of a comb.

The comb is formed of a back member 1 preferably rectangular in cross section having the usual teeth 2 formed integrally on one side thereof. The back is provided with a shank 3 to which a handle 4 of any ordinary type may be secured. Adjacent the handle the back of the comb is provided with a transverse notch 5 as shown in particular in Fig. 1, and within this notch are two leaves 6 and 7 substantially identical in form and corresponding in width to the width of the comb back 1. These two leaves are pivoted adjacent the handle either by means of the screw or pivot 8 and the leaves are of a length just short of the length of the notch to allow the same to be turned outwardly of the length of the notch as is shown in Fig. 1 in which position they extend transversely of the back and rest upon the edges of the upper end of a lamp chimney 9.

By providing the notch 5 as described and the two leaves 6 and 7 the combined thickness of which is equal to the length of the notch, and the width of which is equal to substantially the width of the back, the leaves may be folded entirely within the back as shown particularly in Fig. 2 and when extending as shown in Fig. 1 the upper vertical side 10 of the notch is engaged by the edges of the leaves which prevent reverse folding thereof and these sustain the comb after the manner shown in Fig. 1.

By making the comb of metal as described and providing it with the attachment as shown the devices may very readily be suspended in a lamp chimney to heat the comb preparatory to the combing of the hair.

Having thus briefly described my invention, what I claim and desire to secure by Letters Patent of the United States is—

1. In a comb, a back member provided with a comparatively long transverse notch, a pair of leaves pivoted in superimposed relation in the notch, the leaves being of a width equal to the width of the back of the comb and the combined thickness of the leaves being substantially equal to the depth of the notch, the leaves being pivoted together at one end of the notch and adapted to be turned in opposite directions substantially at a right angle to the back.

2. A comb having a metal back and comb teeth extending from one side thereof, said comb being provided with a handle and the back having a notch adjacent the handle end, a pair of leaves pivotally secured to the back at one end of the notch and adapted to be turned at substantially a right angle to the back to support the comb within a lamp chimney, the end wall of the notch adjacent the pivot point engaging the edges of the leaves limiting the extent of the turning thereof on the pivot.

3. A comb formed with a metal back, teeth extending from one side thereof, a handle for the said comb, a notch in the comb back adjacent the handle end, a pair of superimposed leaves pivotally secured to the back in one end of the notch and adapted to be turned at substantially a right angle to the back to support the comb within a lamp chimney, the notch being of a depth equal to the thickness of the said two leaves and the end wall of the notch adjacent the handle being engaged by the edges of the leaves when used as a support for the comb.

4. In a comb having a handle, a back member, a pair of leaves pivoted thereon near the handle end adapted to be turned substantially at a right angle thereto to provide a support for the comb for the purpose described, and means limiting the extent of turning of the leaves toward the handle.

In testimony whereof I sign this specification.

SOL WILLIAM MOISSELLE.

Copies of this patent may be obtained for five cents each, by addressing the "Commissioner of Patents, Washington, D. C."